(12) United States Patent
Pryce et al.

(10) Patent No.: US 10,776,360 B2
(45) Date of Patent: *Sep. 15, 2020

(54) TECHNIQUES FOR DATA EXTRACTION

(71) Applicant: Palantir Technologies Inc., Palo Alto, CA (US)

(72) Inventors: Huw Pryce, London (GB); James Neale, Norwich (GB); Robert Fink, Palo Alto, CA (US); Jared Newman, New York City, NY (US); Graham Dennis, Downer (AU); Viktor Nordling, Watson (AU); Artur Jonkisz, London (GB); Daniel Fox, London (GB); Felix de Souza, London (GB); Harkirat Singh, New York City, NY (US); Mark Elliot, New York City, NY (US)

(73) Assignee: PALANTIR TECHNOLOGIES INC., Palo Alto, CA (US)

(*) Notice: Subject to any disclaimer, the term of this patent is extended or adjusted under 35 U.S.C. 154(b) by 82 days.

This patent is subject to a terminal disclaimer.

(21) Appl. No.: 16/147,687

(22) Filed: Sep. 29, 2018

(65) Prior Publication Data

US 2019/0034488 A1 Jan. 31, 2019

Related U.S. Application Data

(63) Continuation of application No. 15/225,437, filed on Aug. 1, 2016, now Pat. No. 10,133,782.

(51) Int. Cl.
*G06F 16/00* (2019.01)
*G06F 16/2455* (2019.01)
*G06F 16/25* (2019.01)
*G06F 16/2458* (2019.01)

(52) U.S. Cl.
CPC ...... *G06F 16/2455* (2019.01); *G06F 16/2458* (2019.01); *G06F 16/254* (2019.01)

(58) Field of Classification Search
CPC .......................... G06F 16/254; G06F 16/2458
See application file for complete search history.

(56) References Cited

U.S. PATENT DOCUMENTS

| | | | | |
|---|---|---|---|---|
| 7,912,930 | B1* | 3/2011 | Farooqi | G06Q 10/0631 709/223 |
| 9,262,132 | B1* | 2/2016 | Lugton | G06F 8/36 |
| 9,740,757 | B1* | 8/2017 | Gilder | G06F 16/254 |
| 10,133,782 | B2* | 11/2018 | Pryce | G06F 16/2455 |
| 10,579,627 | B2* | 3/2020 | Nevrekar | G06F 16/24553 |

(Continued)

*Primary Examiner* — Leslie Wong
(74) *Attorney, Agent, or Firm* — Hickman Palermo Becker Bingham LLP (57) ABSTRACT

Computer-implemented techniques for data extraction are described. The techniques include a method and system for retrieving an extraction job specification, wherein the extraction job specification has a source repository identifier that identifies a source repository including a plurality of data records; a data recipient identifier that identifies a data recipient; and a schedule that indicates a timing of when to retrieve the plurality of data records. The method and system further include retrieving the plurality of data records from the source repository based on the schedule, creating an extraction transaction from the plurality of data records, wherein the extraction transaction includes a subset of the plurality of data records and metadata, and sending the extraction transaction to the data recipient.

16 Claims, 5 Drawing Sheets

(56) References Cited

U.S. PATENT DOCUMENTS

| | | | | |
|---|---|---|---|---|
| 2003/0074360 A1* | 4/2003 | Chen | ............ | G06F 8/60 |
| 2004/0107381 A1* | 6/2004 | Bomfim | ............ | G06F 16/22 |
| | | | | 714/4.12 |
| 2005/0044531 A1* | 2/2005 | Chawla | ............ | G06F 8/71 |
| | | | | 717/122 |
| 2006/0069717 A1* | 3/2006 | Mamou | ............ | G06F 16/254 |
| | | | | 709/203 |
| 2007/0083572 A1* | 4/2007 | Bland | ............ | G06F 16/254 |
| 2007/0282951 A1* | 12/2007 | Selimis | ............ | H04L 67/06 |
| | | | | 709/205 |
| 2010/0094829 A1* | 4/2010 | Castellanos | ............ | G06F 16/217 |
| | | | | 707/705 |
| 2012/0066187 A1* | 3/2012 | Pearcy | ............ | G06Q 10/06 |
| | | | | 707/692 |
| 2013/0179244 A1* | 7/2013 | Laffoon | ............ | H04L 63/0823 |
| | | | | 705/14.23 |
| 2013/0179982 A1* | 7/2013 | Bridges | ............ | H04L 63/0823 |
| | | | | 726/26 |
| 2013/0347094 A1* | 12/2013 | Bettini | ............ | G06F 21/577 |
| | | | | 726/11 |
| 2014/0040182 A1* | 2/2014 | Gilder | ............ | G06Q 40/12 |
| | | | | 707/602 |
| 2015/0012476 A1 | 1/2015 | Seng et al. | | |
| 2015/0256617 A1* | 9/2015 | Klose | ............ | G06F 16/119 |
| | | | | 709/217 |
| 2016/0092476 A1* | 3/2016 | Stojanovic | ............ | G06F 16/211 |
| | | | | 707/805 |
| 2016/0117087 A1* | 4/2016 | Couris | ............ | G06F 8/38 |
| | | | | 715/771 |
| 2016/0246809 A1* | 8/2016 | Romano | ............ | G06F 16/254 |
| 2017/0024338 A1* | 1/2017 | Lavasani | ............ | G06F 9/5044 |
| 2017/0223003 A1* | 8/2017 | Miles | ............ | H04Q 63/08 |
| 2017/0351989 A1* | 12/2017 | Langdon | ............ | G06Q 10/06315 |
| 2018/0253343 A1* | 9/2018 | Park | ............ | G06F 9/542 |

\* cited by examiner

FIG. 1

```
┌─────────────────────────────────────────────────────┐
│  ┌───────────────────────────────────────────────┐  │
│  │ Source_Name: fruits_HDFS                      │  │
│  │ Source_Type: HDFS                             │  │
│  │ Source_Root_Directory: webhdfs://localhost:900/path │
│  │                                          202  │  │
│  └───────────────────────────────────────────────┘  │
│  ┌───────────────────────────────────────────────┐  │
│  │ ┌─────────────────────────────────────────┐   │  │
│  │ │ Processor_Name: Processor_1             │   │  │
│  │ │ Processor_Criteria: OnlyMatching data_record_size > 1MB │
│  │ │                                    206  │   │  │
│  │ └─────────────────────────────────────────┘   │  │
│  │ ┌─────────────────────────────────────────┐   │  │
│  │ │ Processor_Name: Processor_2             │   │  │
│  │ │ Processor_Criteria: GroupBy date_last_modified │
│  │ │                                    208  │   │  │
│  │ └─────────────────────────────────────────┘   │  │
│  │ ┌─────────────────────────────────────────┐   │  │
│  │ │ Data_Recipient_Name: fruit_data_record_transformer │
│  │ │                                    210  │   │  │
│  │ └─────────────────────────────────────────┘   │  │
│  │                                          204  │  │
│  └───────────────────────────────────────────────┘  │
│  ┌───────────────────────────────────────────────┐  │
│  │ cronSchedule: "30 * * * * ? *"                │  │
│  │                                          212  │  │
│  └───────────────────────────────────────────────┘  │
│  ┌───────────────────────────────────────────────┐  │
│  │ Completion_Strategy: DeleteAfterTransmission  │  │
│  │                                          214  │  │
│  └───────────────────────────────────────────────┘  │
│                                              200    │
└─────────────────────────────────────────────────────┘
```

TECHNIQUES FOR DATA EXTRACTION

CROSS-REFERENCE TO RELATED APPLICATIONS; BENEFIT CLAIM

This application claims the benefit as a continuation of application Ser. No. 15/225,437, filed Aug. 1, 2016, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure relates to data extraction. More specifically, the disclosure relates to techniques for efficient deployment of data extraction systems.

BACKGROUND

Extracting data records from one or more data sources on a client system can be challenging. For example, deploying a data extraction system can be time-consuming, as it requires building customized solutions and scripts for varied client systems and/or data sources. Additionally, any errors or failures during the data extraction process on a client system can affect many downstream systems that rely on the data records that are being extracted. Such errors and failures are more common when using customized solutions and scripts as such custom solutions are more error prone and likely to contain bugs. Additionally, typical data extraction systems, using custom scripts, intermingle business logic with data extraction logic, thereby reducing the integrity and security of the system as business logic may be applied to the data records at the time of data record extraction, and may corrupt or modify the data records. Improvements to existing data extraction techniques are necessary to solve these and other problems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) the present invention. It will be apparent, however, that the example embodiment(s) may be practiced without these specific details. In other instances, well-known structures and devices are shown in block diagram form in order to avoid unnecessarily obscuring the example embodiment(s).

Embodiments are described herein according to the following outline:
   1.0 General Overview
   2.0 Example System Architecture
      2.1 Extraction Job Specification
      2.2 Data Extraction Agent
      2.3 Data Extraction Explorer
      2.4 Data Record Transformer
      2.5 Coordinator
   3.0 Example Process
   4.0 Implementation Mechanisms—Hardware Overview
   5.0 Implementation Mechanisms—Software Overview
   6.0 Other Aspects of Disclosure
   1.0 General Overview Data extraction from a variety of data sources typically requires preparing custom scripts for data crawlers in a data extraction system. Preparing such custom scripts can be time-consuming and inefficient, and may slow down the deployment of the data extraction system as well as the expansion of an existing data extraction system to include additional data sources. Furthermore, such custom scripts may not be reusable in subsequent data extraction system deployments. Custom scripts are also more prone to errors and bugs that can cause issues to downstream systems that rely on the integrity of the data records that are being extracted.

Techniques for data extraction and collection are described. In one embodiment, a data extraction agent is programmed or configured to perform data extraction from a data source based on one or more extraction job specifications. An extraction job specification is stored digital data that identifies a data source containing data records, a data recipient, and, optionally, a schedule. The data extraction agent executes operations according to the extraction job specification to extract data records from the data source and create a transaction of data records based on the schedule. A transaction may be defined as a set of data to be sent to a data recipient and may include a set of extracted data records and/or metadata. The data comprising the transaction is then sent to the data recipient.

In one embodiment, the extraction job specification may further include an inline processor that indicates one or more operations to perform on the data records during extraction by the data extraction agent. For example, an inline processor may include a regular expression, a structured query language (SQL) query, or some other criteria to apply to the data records during extraction. In another embodiment, the system further comprises a data extraction explorer that interoperates with a user interface to permit computers to view and customize an extraction job specification.

Using these techniques, the embodiments described herein solve the aforementioned problems by allowing for a rapid deployment and expansion of a data extraction system by programmatically implementing the extraction system without requiring custom scripting. The system can be deployed in any environment, and any necessary customization can be performed via the extraction job specification, without the need to prepare custom scripts for data extraction. Furthermore, in one embodiment, the present system provides various security advantages, as the data extraction system does not apply business logic to the data records. Rather, the business logic can be implemented solely at the data recipient. Therefore, the present implementation separates the business logic from the data extraction system, improving security and improving the ability of multiple parties to work on different aspects of the data extraction at the client system.

2.0 Example System Architecture

Figure 1:
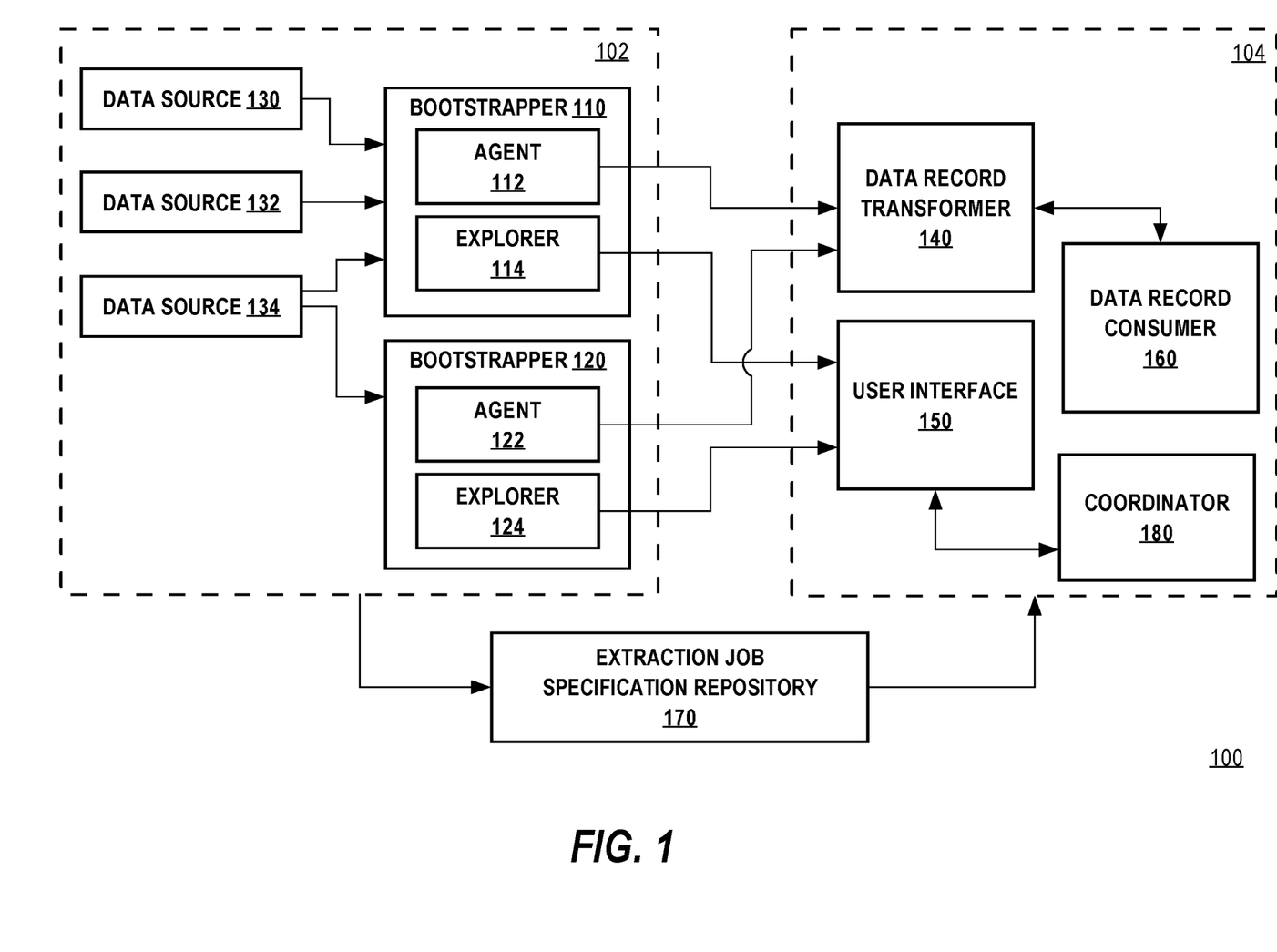
FIG. 1 is a block diagram of a data extraction computer system, according to one embodiment.

FIG. 1 illustrates an example data extraction system in which the techniques described herein may be practiced, according to some embodiments. In the example of FIG. 1, a data extraction system 100 is a computer system programmed to perform data extraction and may be implemented across one or more computing devices. The example components of data extraction system 100 shown in FIG. 1 are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. Data extraction system 100 illustrates only one of many possible arrangements of components configured to execute the programming described herein. Other arrangements may include fewer or different components, and the division of work between the components may vary depending on the arrangement.

Data extraction system 100 is programmed or configured to efficiently extract data from one or more client systems 102 and to provide the extracted data to one or more server systems 104. In one embodiment, client system 102 and server system 104 are different computers, however, in another embodiment, client system 102 and server system 104 are implemented on the same computing device.

Client system 102 also may be implemented across one or more computing devices and comprises one or more one or more data sources 130, 132, 134. A "data source" may be any repository of computer-implemented data records. A "data record" may be defined as any computer-implemented data, such as a file, a data object, a database entry, a data message, or any other similar representation of computer-implemented data. The embodiments described herein do not require any particular type or format of the data records provided by a data source. Thus, a data source may comprise a file system, a relational database managements system (RDBMS), a non-relational database, an object store, a distributed file system (DFS) such as a Hadoop distributed file system (HDFS), a Java Database Connectivity (JDBC) source, an email repository, data received through an application programming interface (API), a source code repository, a cloud-based data repository such as Amazon Simple Storage Service (S3), a message queue, or any other repository on one or more computing devices that contains data records. Each of the data sources 130, 132, 134 may be implemented as a different type of data source. For example, in client system 102, data source 130 may be a HDFS data source, data source 132 may be a RDBMS data source, and data source 134 may be a traditional file system data source.

Client system 102 includes one or more bootstrappers 110, 120. A "bootstrapper" may be a program or system that is configured or programmed for assisting in the extraction of data records from one or more data sources. In one embodiment, a bootstrapper does not include any business logic that modifies the data records that are extracted, thereby ensuring that the integrity and security of the data records and their data sources is maintained. A bootstrapper may include a data extraction agent. For example, bootstrapper 110 includes data extraction agent 112 and bootstrapper 120 includes data extraction agent 122. A "data extraction agent" may be a subsystem of a bootstrapper that is programmed or configured for crawling a data source and/or performing data extraction of data records from a data source using one or more extraction job specifications, as will be described herein.

A bootstrapper may optionally include a data extraction explorer. For example, bootstrapper 110 includes data extraction explorer 114 and bootstrapper 120 includes data extraction explorer 124. A "data extraction explorer" may be a subsystem of a bootstrapper that is programmed or configured for providing a communications interface between a bootstrapper and a user interface, such as user interface 150, as described in other sections herein.

In one embodiment, the bootstrapper is programmed or configured to manage the life cycle and resource management of its data extraction agent and/or data extraction explorer. In another embodiment, a bootstrapper includes an application programming interface (API) to an external system (not depicted) that is programmed or configured to query the bootstrapper for metrics regarding the performance of the data extraction agent and/or data extraction explorer. These metrics can include data regarding the amount of data records that have been extracted from one or more data sources, the amount of transactions sent downstream to a server system 104, the computing resources used by the data extraction agent and/or explorer, such as disk space and CPU, log files, and errors and warnings detected by the data extraction agent and/or data extraction explorer.

Each of data sources 130, 132, and 134 is communicatively coupled to one or more bootstrappers. For example, in system 100, data sources 130, 132, and 134 are communicatively coupled to bootstrapper 110. Similarly, in system 100, data source 134 is communicatively coupled to bootstrapper 120. As can be seen with the example of data source 134, a data source may be communicatively coupled to multiple bootstrappers. Coupling a data source to multiple bootstrappers can improve system redundancy. Alternatively, coupling a data source to multiple bootstrappers can allow for unique handling of the data records from that data source by different bootstrappers. Additionally, a bootstrapper may be communicatively coupled to one or more data sources.

Server system 104 includes a data record transformer 140. A "data record transformer" may be a subsystem that is programmed or configured for processing and/or manipulating data records received from one or more data extraction agents that are communicatively coupled to the data record transformer. For example, in data extraction system 100, data record transformer 140 is communicatively coupled to data extraction agent 112 and data extraction agent 122. Data extraction agent 112 and data extraction agent 122 each is programmed or configured to transmit a transaction containing extracted data records collected from data sources 130, 132, and 134 to data record transformer 140. In one embodiment, data record transformer 140 is programmed or configured to transform the extracted data records by applying one or more algorithms or data manipulation operations to the extracted data records. In one embodiment, the data manipulation operations applied by a data record transformer 140 includes business logic for manipulating the extracted data records. For example, in one embodiment, the data record transformer 140 creates transformed data as the result of transforming the extracted data records. In one embodiment, a data record transformer 140 is programmed or configured for storing data in a data storage device coupled to server system 104 (not depicted) related to the extracted data records. The stored data could be the original extracted data records as received from data extraction agents 112 and/or 122, or the transformed data. Although depicted in FIG. 1 as a single data record transformer, in another embodiment, server system 104 may include multiple data record transformers 140 that may be arranged serially, in parallel, or in some other configuration.

Server system 104 may optionally include data record consumer 160. A "data record consumer" may be a subsystem that consumes data received from data record transformer 140. Data record consumer 160 may be communicatively coupled to data record transformer 140. In one embodiment, data record consumer 160 is programmed or configured to interoperate with a client computer to view the contents of the data records or the transformed data after processing by data record transformer 140.

In one embodiment, client system 104 may optionally include user interface 150 that is communicatively coupled to one or more data extraction agents 112 and/or 122. User interface 150 may be used to interact with data extraction explorer 114 and/or data extraction explorer 124, as will be described herein. In one embodiment, data extraction explorer 114 may be communicatively coupled to extraction job specification repository 170 and/or coordinator 180.

Extraction job specification repository 170 is a repository that stores one or more extraction job specifications. An extraction job specification includes one or more configuration files that provide configuration details describing how to extract data records from a data source. Thus, an extraction job specification can be used by data extraction agent 112 or 122 to perform data extraction from data sources 130, 132, or 134. Further details about the contents of an extraction job specification will be described herein. Extraction job specification repository can be communicatively coupled to client system 102 and/or server system 104. In one embodiment, extraction job specification repository 170 is a part of client system 102. In another embodiment, extraction job specification repository 170 is a part of server system 104. In yet another embodiment, extraction job specification repository 170 is implemented as its own system, separate from client system 102 and/or server system 104.

In one embodiment, server system 104 includes a coordinator 180. Coordinator 180 may be responsible for managing bootstrappers 110 and 1120 and/or extraction job specification repository 170.

2.1 Extraction Job Specification

An extraction job specification includes one or more configuration files that provide configuration details for how to extract data records from a data source. In one embodiment, an extraction job specification can be implemented in any markup language or data format syntax, such as extensible markup language (XML), "YAML Ain't Markup Language" (YAML), or JavaScript Object Notation (JSON), and is stored in the form of digital data in a storage device or digital memory.

Figure 2:
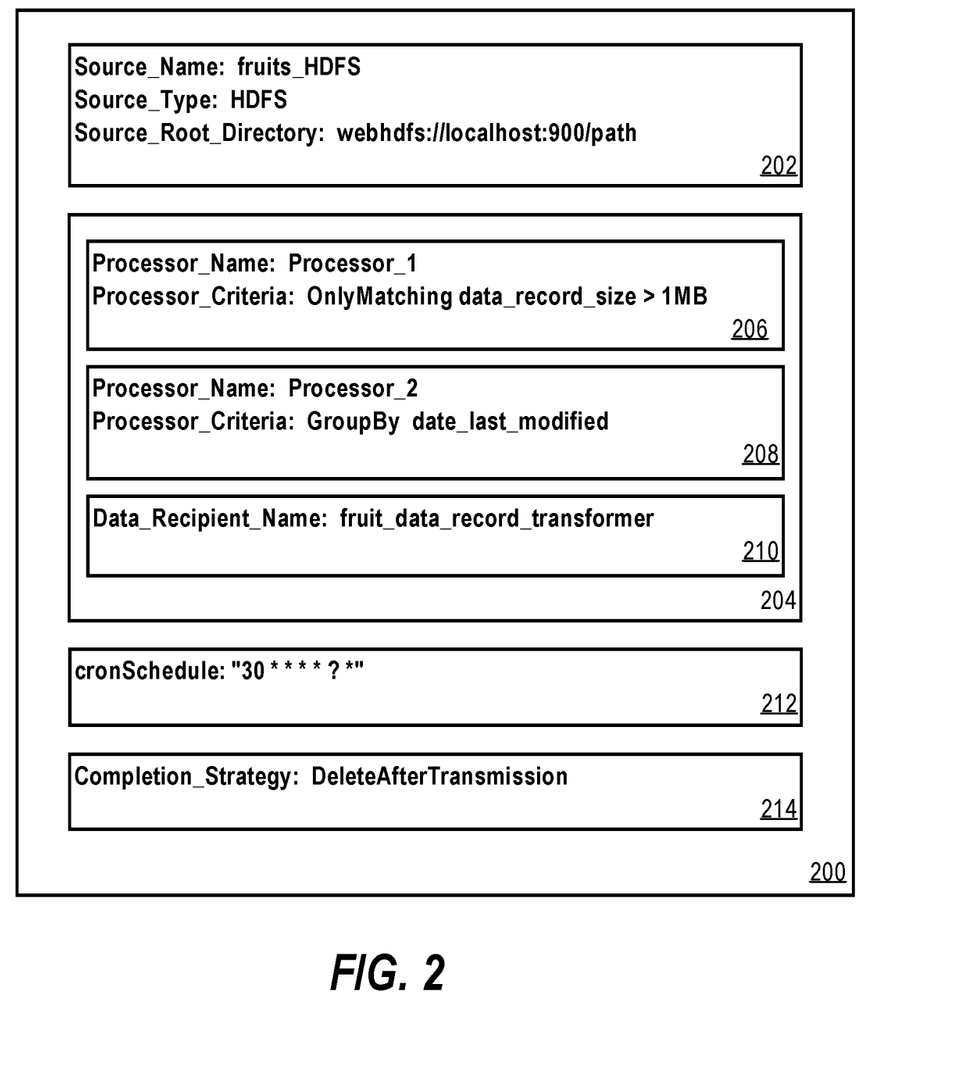
FIG. 2 is block diagram of an extraction job specification, according to one embodiment.

FIG. 2 illustrates an exemplary extraction job specification 200, according to one embodiment. An extraction job specification includes a data source repository identifier. A data source repository identifier identifies one or more data sources that a data extraction agent should crawl and extract data from. In one embodiment, a data source repository identifier could include the name of computing device that contains a data source, an IP address of a data source, or any other identifier that identifies a data source. For example, extraction job specification 200 includes data source repository 202 that identifies a data source repository with a Source_Name of "fruit_HDFS", a Source_Type of "HDFS" and a Source_Root_Directory of "webhdfs://localhost:900/path".

An extraction job specification includes one or more target mappings. A target mapping identifies criteria for extracting data from a data source. For example, extraction job specification 200 includes target mapping 204. A target mapping may include one or more inline processors and one or more data recipient identifiers. For example, target mapping 204 includes inline processors 206 and 208. An inline processor is a set of operations to be performed on data records that are being extracted from a data source during the extraction process. In one embodiment, an inline processor will only perform minimal processing of the data from a data source, as further processing will be handled by a downstream data record transformer on the server side. Thus, an inline processor will not contain any business logic and will not view the internal contents of a data record. An inline processor can indicate criteria that must be applied to a data record during data extraction. For example, inline processor 206 indicates that the data extraction agent will only process data records that have a data_record_size that exceeds 1 MB. Thus, in this example, any data records that do not exceed 1 MB will be ignored during the data extraction process. Similarly, inline processor 208 indicates that data records should be grouped together based on the date_last_modified criteria using a "GroupBy" operation. Thus, based on inline processor 208, data records that have been modified on the same date will be grouped together into a single transaction when transmitted to a server system instead of being sent as individual transactions. Inline processors are pluggable, as a user can implement a customized inline processor by specifying one or more criteria to apply to a data record during data extraction. For example, in one embodiment, an inline processor may include one or more scripts, regular expressions, and/or SQL expressions to apply to data records during the data extraction process. By using a, script, regular expression, and/or a SQL expression, a user computer can specify the criteria to be used during the extraction process performed by the data extraction agent. Thus a user can, using a user computer, easily write and provide a customized pluggable inline processor. Moreover, an inline processor provides filtering and/or grouping functionality during runtime of the extraction process by the data extraction agent. Inline processors allows for customization of data extraction techniques by the present data extraction system without requiring the details of custom script writing.

Additionally, target mapping 204 may include one or more data recipient identifiers. For example, target mapping 204 includes data recipient identifier 210. A data recipient identifier identifies one or more data recipients, located at a server system, to receive data extracted from the one or more data sources identified by the data source repository identifier. Data recipients may comprise computers, files, programs, methods, objects, threads, processes and the like. In one embodiment, a data recipient identifier may identify one or more data record transformers 140 that are to receive data from a data source 130, 132, and/or 134. In the example of extraction job specification 200, data recipient identifier 210 indicates that the data received from a processor will be sent to a data record transformer called "fruit_data_record_transformer". In another embodiment, a data recipient identifier may identify one or more data record consumers 160 that are to receive data records from a data source 130, 132, and/or 134.

In one embodiment, an extraction job specification optionally includes a schedule that indicates the timing of when to retrieve data records from the data source. For example, extraction job specification 200 includes schedule 212. A schedule can be implemented as any sort of syntax or data structure that can be used to specify the timing of when a data extraction agent is to retrieve data records from a data source. For example, schedule 212 is implemented as a cron schedule string, wherein each position in the cron schedule string refers to a different granularity of scheduling. For example, in one embodiment, the first position in the string represents seconds, the second position represents minutes, the third position represents hours, the fourth position represents the day of the month, the fifth position represents the month, the sixth position represents the day of the week, and the seventh position represents the year. Thus, the schedule 212, represented as "30 * * * * ? *", indicates that the data extraction for this particular target mapping should occur every 30 seconds. Schedule 212 allows a user computer to quickly and easily customize the frequency that data records should be extracted from a data source. This customization can occur directly in the extraction job specification, without having to be hard-coded in the data extraction agent. In another embodiment, an extraction job specification does not include a schedule. Instead, the extraction job specification may be remotely triggered to execute by a data extraction agent 112, for example, via a user interface on a remote computing device.

An extraction job specification may optionally include a completion strategy processor. A completion strategy processor identifies one or more operations to apply to a data record in a data source after extracting the data record and/or after sending a transaction containing the data record to a data recipient. For example, extraction job specification 200 includes a completion strategy processor 214 that indicates that a data record should be deleted after transmission to a server system. A completion strategy processor can be specified for any sort of data record manipulation operation, including deleting the data record, encrypting the data record, copying the data record, moving the data record, etc. In one embodiment, a completion strategy processor can be implemented as a regular expression or a SQL query.

In one embodiment, an extraction job specification may include a package, library, data object, or file that can be used to help configure access to a data source. For example, an extraction job specification may include a Java Archive (JAR) file, a dynamic link-library (DLL) file, a device driver, or any other kind of package, library, or configuration file that can enable access to a data source.

2.2 Data Extraction Agent

Data extraction agent 112 is programmed or configured to perform live data extraction from one or more data sources 130, 132, and/or 134 by using a data extraction job specification. Although the present discussion will discuss data extraction agent 112, similar logic may be applied to data extraction agent 124. Data extraction agent 112 is programmed or configured to contact and query, or "crawl," one or more data sources 130, 132, and/or 134, as specified in the data source repository identifier of the extraction job specification, to identify new data records for extraction. Data extraction agent 112 is programmed or configured to perform crawling and extraction of data records based on the schedule specified in the data extraction job specification. In one embodiment, data extraction agent 112 uses the relevant package, library, or configuration file specified in the extraction job specification in order to crawl and/or extract data records from a data source 130, 132, and/or 134. The data extraction agent 112 thus crawls the data sources 130, 132, and/or 134 and collects data records that should be transmitted to a downstream system, such as data record transformer 140.

During this extraction process, data extraction agent 112 is programmed or configured to apply one or more inline processors that are specified in the extraction job specification to data records that are extracted from a data source. Such inline processors may filter the data records and/or group them into a set of data records that should be handled in a single transaction. The data extraction agent 112 creates a transaction for transmission to a data recipient as identified by the extraction job specification. As described earlier, a transaction is a set of data that includes one or more extracted data records and may optionally include additional metadata. Metadata may include data regarding the size of the transaction, the data source of the data records, the timing of the data extraction, errors or warning messages regarding the data extraction, or any other information regarding the data extraction. In one embodiment, the extracted data records included in a transaction are unmodified and are thus the same as the data records that were collected from the data sources, because the data extraction agent 112 does not apply any business logic to the data records during the extraction process. Thus, the data records that are included in the transaction are unmodified and uncorrupted. This ensures that the data records that are sent downstream are accurate and minimizes the likelihood of corruption to the data records by the data extraction agent 112, which could affect downstream systems.

Once data extraction agent 112 has extracted the data records from the one or more data sources and/or once the data extraction agent 112 has sent the transaction to the data record transformer 140, the data extraction agent 112 is programmed or configured to apply one or more completion strategy processors to the data records, such as deletion, encrypting, copying, moving, or similar data record manipulation operations. The completion strategy processors can be specified in the extraction job specification.

In one embodiment, data extraction agent 112 and its application of inline processors and/or completion strategy processors are configured or programmed not to modify the contents of the data records that are packaged into a transaction. Data extraction agent 112 only does minimal processing on the data records, where the processing is focused on extraction-related tasks, and does not include any business logic for data transformation. Such business logic for data transformation can be segregated into the downstream data record transformer 140. By segregating the application of business logic away from data extraction agent 112, the present data extraction system allows multiple parties to manage different aspects of the data extraction process. A first party may be a customer that is interested in having its data records extracted from client system 102. The first party can ensure that that bootstrapper 110 and data extraction agent 112 have appropriate read and/or write access to data sources 130, 132, and 134. A second party may be a party that is assisting with technical aspects of how and when the data record extraction is performed. The second party can customize the data extraction agent 112, via the extraction job specification, to customize the specifics of the data extraction, including, but not limited to what kind of data records extracted, how data records are extracted, how data records are grouped into transactions, and/or when the data records are extracted. Business logic is segregated downstream to data record transformer 140 to ensure that the business logic and data record transformation do not interfere with the ability of the second party to customize how and when the data record extraction is performed. Any such business logic can be applied at a server system 104. This architecture ensures that two different parties can safely and securely manage the data record extraction process on client system 102, within interference from business logic, as such business logic is segregated to server system 104.

Moreover, by segregating the business logic away from data extraction agent 112, the present data extraction system does not require repeated updates to the data extraction agent 112 every time a change to business logic is made. Instead, any changes to business logic can be made at the server system 104, for example in data record transformer 140 or in data record consumer 160.

The present system allows for rapid deployment of new data extraction agents by using an extraction job specification instead of having to write custom scripts for such data extraction. The format and structure of such extraction job specifications can be reusable for similar data sources across different deployments of the data extraction system. For example, a similar extraction job specification can be used for a first RDBMS data source in a first deployment of a data extraction job system as a second RDBMS data source in a second deployment of a data extraction job system in a second client system. During the second deployment, a user computer, program or system will merely need to modify certain fields of the extraction job specification, without having to write a custom or bespoke script for the data extraction process.

In one embodiment, data extraction agent 112 is programmed or configured to perform basic data validation on a data record before including the data record in a transaction. For example, data extraction agent 112 can validate that a data record is not corrupt. If a data record is corrupt, it may be excluded from a transaction.

In one embodiment, data extraction system 100 includes multiple data extraction agents 112 and 122. Including multiple data extraction agents 112 and 122 on a client system 102 can allow for load balancing between the data extraction agents 112 and 122, and/or allow for customized handling of different data sources by different data extraction agents 112 and 122. In one embodiment, each data extraction agent 112 and 122 uses its own unique extraction job specification(s), however, in another embodiment, each data extraction agents 112 and 122 share access to the same extraction job specification(s).

2.3 Data Extraction Explorer

In one embodiment, a bootstrapper may optionally include a data extraction explorer that provides a communication interface from the bootstrapper to the server system. For example, data extraction system 100 includes data extraction explorer 114 and/or data extraction explorer 124. The following description will describe embodiments with relation to data extraction explorer 114, however, analogous functionality could be included in data extraction explorer 124. Data extraction explorer 114 is responsible for carrying out operations in bootstrapper based on communications with user interface 150. In one embodiment, data extraction explorer 114 is programmed or configured to interoperate with a user interface 150 to view the contents of an extraction job specification that is being used by bootstrapper 110. In one embodiment, data extraction explorer 114 allows a user interface 150 to view the file structure of data records in one or more data sources connected to bootstrapper 110. In one embodiment, data extraction explorer 114 allows a user interface 150 to view error messages and/or metadata associated with data extraction from the data sources connected to bootstrapper 110. In one embodiment, data extraction explorer 114 allows a user interface 150 to view the status of one or more transactions in bootstrapper 110. In one embodiment, data extraction explorer 114 is programmed or configured to interoperate with a user interface 150 to view log messages associated with bootstrapper 110.

In one embodiment, data extraction explorer 114 allows a user computer to interact with and test new or modified extraction job specifications via user interface 150. A user computer can access a user interface 150 that allows them to modify a proposed extraction job specification. The user computer can send the proposed extraction job specification to data extraction explorer 114 and have the data extraction explorer 114 run the proposed extraction job specification by accessing data extraction agent 112. For example, a user computer can input regular expressions and SQL expressions to be used in a proposed extraction job specification that will be included in an inline processor or completion strategy processor. The data extraction explorer 114 can run the proposed extraction job specification and send the results to the user interface 150 so that a user can view and verify that results were as expected. This functionality allows a user computer to interact with and test changes to a proposed extraction job specification before deploying it to the extraction job specification repository 170.

In one embodiment, the initiation of communication between a data extraction explorer 114 and user interface 150 is one-sided and can only be initiated by the data extraction explorer 114. For example, the user interface cannot directly send requests to the data extraction explorer 114. Instead, the data extraction explorer 114 will periodically poll the user interface 150 to determine if the user interface 150 has any pending requests that have not been processed. These requests could include, for example, a request to run a particular proposed extraction job specification. The timing of this polling can be pre-configured via a setting. In one embodiment, for example, the polling can occur every 30 seconds. When the data extraction explorer 114 detects a pending request at the user interface 150, the data extraction explorer 114 can execute the pending request and then send the results of the execution back to the user interface 150. By limiting the communication between the systems to be one-sided as described, the security of the system is improved, as the user interface 150 located at server system 104 cannot initiate a data transfer between the systems. Instead, the initiation of all data transfers must occur at the client system 102. Therefore, if the server system 104 is compromised, for example by malicious software ("malware"), the server system 104 cannot actively initiate a data transfer to data extraction explorer 114, for example, to run a compromised proposed extraction specification. The client system 102 can protect itself against such data transfers by disabling its polling function.

In one embodiment, the data extraction explorer 114 is implemented on a separate virtual machine than the data extraction agent 112 so that the performance of the data extraction agent 112 is not degraded based on the performance of the data extraction explorer 114.

2.4 Data Record Transformer

Data record transformer 140 is a subsystem of server system 104 that includes instructions for data manipulation operations to modify or transform one or more extracted data records that are received from a data extraction agent. In one embodiment, these data manipulation operations may save the extracted data records in a data storage system coupled to server system 104. In one embodiment, the data record transformer 140 modifies the extracted data records and creates transformed data records that represent the output of the data manipulation operations. In one embodiment, these data manipulation operations include operations for cleaning and/or validating the extracted data records when creating the transformed data records. In one embodiment, the transformed data records are stored in data storage. The data manipulation operations that are employed by data record transformer 140 include system-specific business logic. By segregating the system-specific business logic away from bootstrappers 110 and 120, the data extraction system 100 can ensure the integrity and security of the data records and data sources extracted at client system 102. Likewise, by segregating the system-specific business logic away from bootstrappers 110 and 120, the management of the data extraction process can be shared across two parties: a first party that provides read and/or write access from bootstrappers 110 and 120 to data sources 130, 132, and 134; and a second party that can customize the specific technical details of how and when data record extraction is performed via extraction job specifications that are accessible to data extraction agents 112 and 122. Furthermore, by segregating the system-specific business logic to the data record transformer 140, the data extraction system 100 also ensures that the bootstrappers 110 and 120 can be rapidly deployed, as they do not require custom scripting that includes system-specific business logic. Instead, the bootstrappers 110 and 120 can be implemented as subsystems that are agnostic of business logic, thereby ensuring that the data extraction system can be deployed onto new client systems 102 quickly without requiring custom scripting or bespoke implementations for particular business scenarios.

In one embodiment, server system 104 can include multiple data record transformers 140 that can either share a similar business logic function or be responsible for separate business logic functions. These multiple data record transformers 140 can be implemented serially, in parallel, or in some other configuration.

In one embodiment, data record transformer 140 can provide access to the transformed data records to a data record consumer 160. Data record consumer can be an end-user application, or an application programming interface (API) for communication with separate systems.

In one embodiment, all communication between a data extraction agent 112 and data record transformer 140 is one-sided and can only be initiated by the data extraction agent 112 and not the data record transformer 140. By insulating the initiation of communication such that it always must originate from the client system 102, the security of the system is improved, as it prevents the server system 104 from pushing unwanted malware to the client system 102. In one embodiment, data extraction agent 112 can check for new message requests by the data record transformer 140 by periodically polling the data record transformer 140. If the security of the server system 104 is compromised, the data extraction agent 112 can disable the polling to protect client system 102.

2.5 Coordinator

In one embodiment, server system 104 includes coordinator 180. Coordinator 180 is a subsystem responsible for managing bootstrappers 110 and/or 120. For example, in one embodiment, coordinator 180 can manage the load balance between multiple bootstrappers 110 and 120. In one embodiment, bootstrappers 110 and/or 120 may send log files to coordinator 180 to allow the coordinator 180 to perform debugging functions for the bootstrappers and/or generate warning notifications about potential technical issues occurring in the bootstrappers.

In one embodiment, coordinator 180 may further manage an extraction job specification repository 170. For example, after a user computer has approved the deployment of a new extraction job specification, the coordinator 180 can notify the extraction job specification repository 170 that a new approved extraction job specification is ready for deployment in the data extraction system 100. The extraction job specification repository 170 can then retrieve the new extraction job specification with the help of the coordinator 180 and send the new extraction job specification to the appropriate bootstrappers. In another embodiment, the coordinator 180 can push the new extraction job specification to extraction job specification repository 170.

3.0 Example Process

Figure 3:
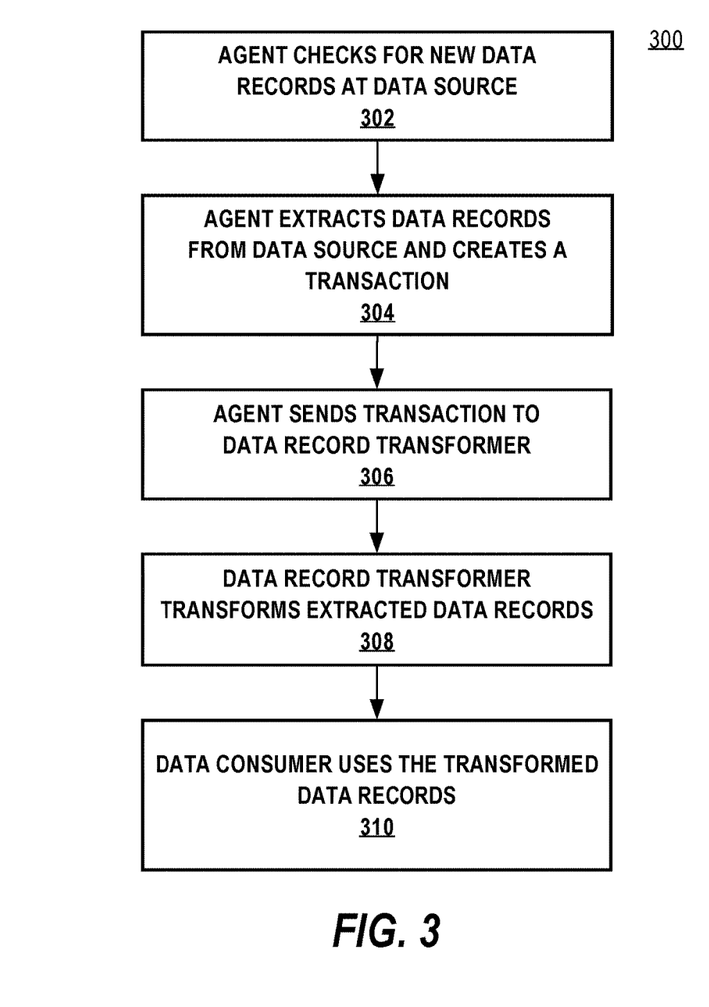
FIG. 3 is a flow diagram of a process for data extraction, according to one embodiment.

FIG. 3 illustrates a process 300 of extracting data from data source. For purposes of illustrating a clear example, FIG. 3 is described with reference to data extraction system 100, but other embodiments may implement or execute the process 300 using other computer systems. FIG. 3, and each other flow diagram in this disclosure, is intended to illustrate an algorithm that can be used as the basis of programming an implementation of one or more of the claims that are set forth herein, using digital computers and a programming language or development environment, and is illustrated and described at the level at which skilled persons, in the field to which this disclosure is directed, are accustomed to communicating with one another to identify or describe programs, methods, objects and the like that can provide a working system.

In step 302, a data extraction agent is programmed or configured to use an extraction job specification to check for new data records at a data source using the extraction job specification. In one embodiment, the data extraction agent receives the extraction job specification from an extraction job specification repository. The data extraction agent crawls the data source specified by the data source repository identifier of the extraction job specification in order to identify new data records. The data extraction agent crawls for new data records at the data source based on the schedule specified in the extraction job specification. Thus, in one embodiment, if the schedule indicates that new data records should be extracted every 30 seconds, the data extraction agent will crawl the data source every 30 seconds, based on the schedule, to identify new data records that have not been previously extracted. In another embodiment, the data extraction agent will continuously crawl the data source for new data records that have not been previously extracted, but will delay further processing until 30 seconds have elapsed since a prior transaction was sent to a server system, based on the schedule. Once the data extraction agent has identified new data records at the data source, the process 300 proceeds to step 304.

In step 304, the data extraction agent is programmed or configured to use the extraction job specification to extract new data records from the data source, as determined by step 302. In one embodiment, data extraction agent uses any configuration files, packages or libraries specified in the extraction job specification to extract data records from the data source. For example, the data extraction agent may use a JAR, DLL, device driver, or other package or library specified in the extraction job specification to perform the extraction from the data source. In one embodiment, the data extraction agent applies any inline processors specified in the extraction job specification to the extracted data records. For example, the data extraction agent may run a regular expression or SQL query against extracted data records, or may group certain data records together into a single transaction. Once the data extraction agent has extracted the new data records, the data extraction agent then creates one or more transactions that include the extracted data records. A transaction may be defined as a set of data and may include a set of one or more extracted data records. In one embodiment, a transaction may include additional metadata regarding the extracted data records, such as the data source repository identifier, a timestamp for extraction, details regarding one or more inline processors that were applied to the extracted data records, error codes or runtime exceptions that occurred during data extraction, an identifier of the data recipient for the extracted data records, or the like. Once the data extraction agent has generated a transaction, the process proceeds to step 306.

In step 306, the data extraction agent is programmed or configured to send the one or more transactions to the data record transformer identified by the data recipient identifier in the extraction job specification. The process proceeds to step 308.

In step 308, the data record transformer is programmed or configured to transform the extracted data records into transformed data records. The transform process may include applying business logic to the extracted data records, storing a copy of the extracted data records in a data storage device, or any other operation that modifies or manipulates the data records. In one embodiment, multiple data record transformers transform the extracted data records. For example, in one embodiment, multiple data record transformers transform the extracted data records serially in a pipeline. In another embodiment, multiple data record transformers transform the extracted data records in parallel. In yet another embodiment, multiple data record transformers transform the extracted data records in some combination of serial and/or parallel processing. Once the data record transformer has transformed the data records, the process proceeds to step 310.

In step 310, the data record consumer is programmed or configured to access the transformed data records. In one embodiment, the data record consumer may view the contents of the transformed data records by accessing the transformed data records in a data storage device. In another embodiment, the data record transformer sends the transformed data records to the data record consumer. In one embodiment, the data record consumer allows a user computer to view the contents of the transformed data records. In one embodiment, the data record consumer can generate reports regarding the transformed data and/or publish the transformed data. The process may then end, return control to a calling process, or transfer control to another process.

4.0 Implementation Mechanisms—Hardware Overview

Figure 4:
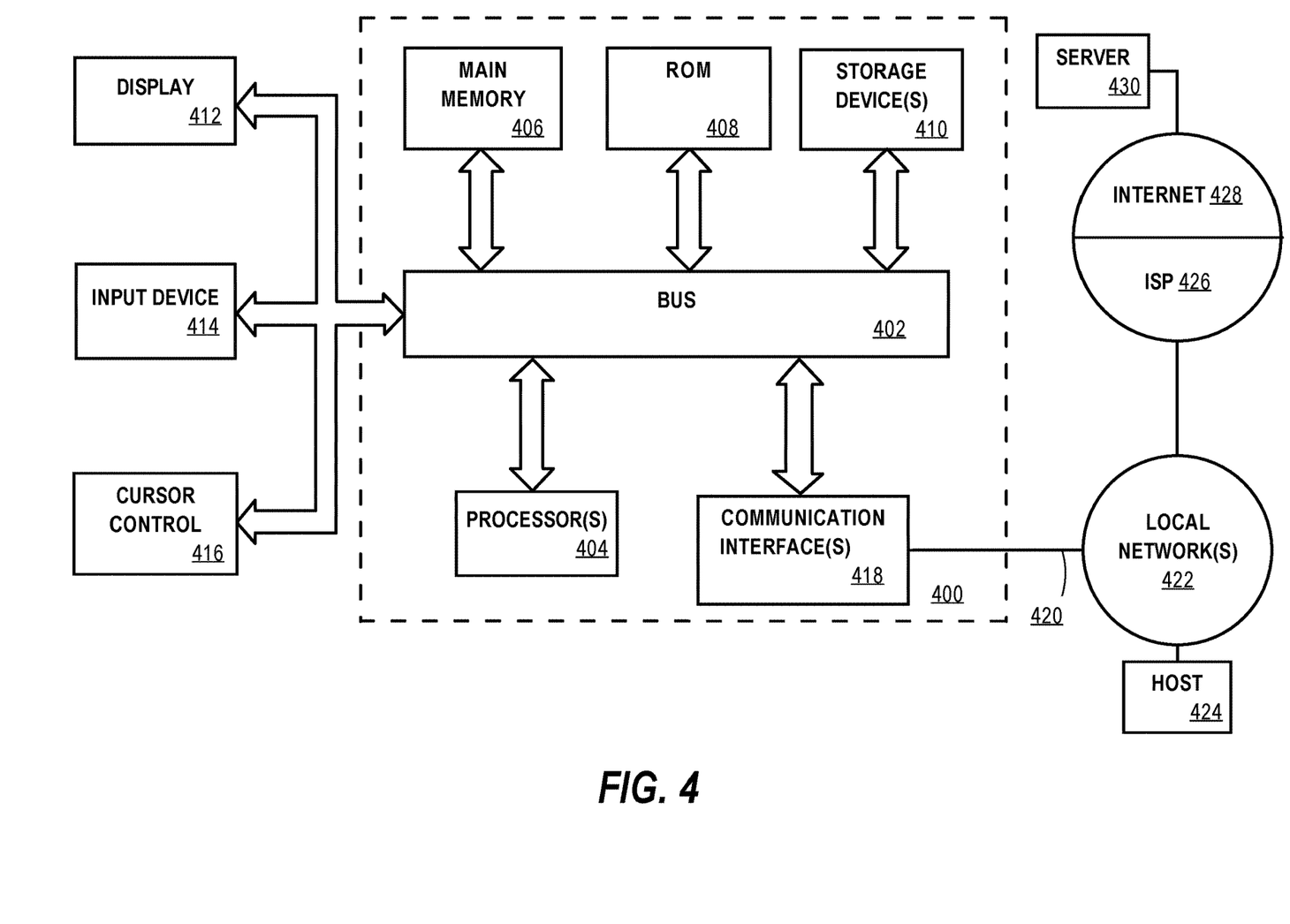
FIG. 4 is a block diagram of a computing device in which the example embodiment(s) of the present invention may be embodied.

Referring now to FIG. 4, it is a block diagram that illustrates a basic computing device 400 in which the example embodiment(s) of the present invention may be embodied. Computing device 400 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 400 may include a bus 402 or other communication mechanism for addressing main memory 406 and for transferring data between and among the various components of device 400.

Computing device 400 may also include one or more hardware processors 404 coupled with bus 402 for processing information. A hardware processor 404 may be a general purpose microprocessor, a system on a chip (SoC), or other processor.

Main memory 406, such as a random access memory (RAM) or other dynamic storage device, also may be coupled to bus 402 for storing information and software instructions to be executed by processor(s) 404. Main memory 406 also may be used for storing temporary variables or other intermediate information during execution of software instructions to be executed by processor(s) 404.

Software instructions, when stored in storage media accessible to processor(s) 404, render computing device 400 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 400 also may include read only memory (ROM) 408 or other static storage device coupled to bus 402 for storing static information and software instructions for processor(s) 404.

One or more mass storage devices 410 may be coupled to bus 402 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 410 (e.g., the main hard disk for the device) stores a body of program and data for directing operation of the computing device, including an operating system, user application programs, driver and other support files, as well as other data files of all sorts.

Computing device 400 may be coupled via bus 402 to display 412, such as a liquid crystal display (LCD) or other electronic visual display, for displaying information to user computer. In some configurations, a touch sensitive surface incorporating touch detection technology (e.g., resistive, capacitive, etc.) may be overlaid on display 412 to form a touch sensitive display for communicating touch gesture (e.g., finger or stylus) input to processor(s) 404.

An input device 414, including alphanumeric and other keys, may be coupled to bus 402 for communicating information and command selections to processor 404. In addition to or instead of alphanumeric and other keys, input device 414 may include one or more physical buttons or switches such as, for example, a power (on/off) button, a "home" button, volume control buttons, or the like.

Another type of user input device may be a cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

While in some configurations, such as the configuration depicted in FIG. 4, one or more of display 412, input device 414, and cursor control 416 are external components (i.e., peripheral devices) of computing device 400, some or all of display 412, input device 414, and cursor control 416 are integrated as part of the form factor of computing device 400 in other configurations.

Functions of the disclosed systems, methods, and modules may be performed by computing device 400 in response to processor(s) 404 executing one or more programs of software instructions contained in main memory 406. Such software instructions may be read into main memory 406 from another storage medium, such as storage device(s) 410. Execution of the software instructions contained in main memory 406 cause processor(s) 404 to perform the functions of the example embodiment(s).

While functions and operations of the example embodiment(s) may be implemented entirely with software instructions, hard-wired or programmable circuitry of computing device 400 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more software instructions to processor(s) 404 for execution. For example, the software instructions may initially be carried on a magnetic disk or solid-state drive of a remote computer. The remote computer can load the software instructions into its dynamic memory and send the software instructions over a telephone line using a modem. A modem local to computing device 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor(s) 404 retrieves and executes the software instructions. The software instructions received by main memory 406 may optionally be stored on storage device(s) 410 either before or after execution by processor(s) 404.

Computing device 400 also may include one or more communication interface(s) 418 coupled to bus 402. A communication interface 418 provides a two-way data communication coupling to a wired or wireless network link 420 that is connected to a local network 422 (e.g., Ethernet network, Wireless Local Area Network, cellular phone network, Bluetooth wireless network, or the like). Communication interface 418 sends and receives electrical, electromagnetic, or optical signals that carry digital data streams representing various types of information. For example, communication interface 418 may be a wired network interface card, a wireless network interface card with an integrated radio antenna, or a modem (e.g., ISDN, DSL, or cable modem).

Network link(s) 420 typically provide data communication through one or more networks to other data devices. For example, a network link 420 may provide a connection through a local network 422 to a host computer 424 or to data equipment operated by an Internet Service Provider (ISP) 426. ISP 426 in turn provides data communication services through the world wide packet data communication network now commonly referred to as the "Internet" 428. Local network(s) 422 and Internet 428 use electrical, electromagnetic or optical signals that carry digital data streams. The signals through the various networks and the signals on network link(s) 420 and through communication interface(s) 418, which carry the digital data to and from computing device 400, are example forms of transmission media.

Computing device 400 can send messages and receive data, including program code, through the network(s), network link(s) 420 and communication interface(s) 418. In the Internet example, a server 430 might transmit a requested code for an application program through Internet 428, ISP 426, local network(s) 422 and communication interface(s) 418.

The received code may be executed by processor 404 as it is received, and/or stored in storage device 410, or other non-volatile storage for later execution.

5.0 Implementation Mechanisms—Software Overview

Figure 5:
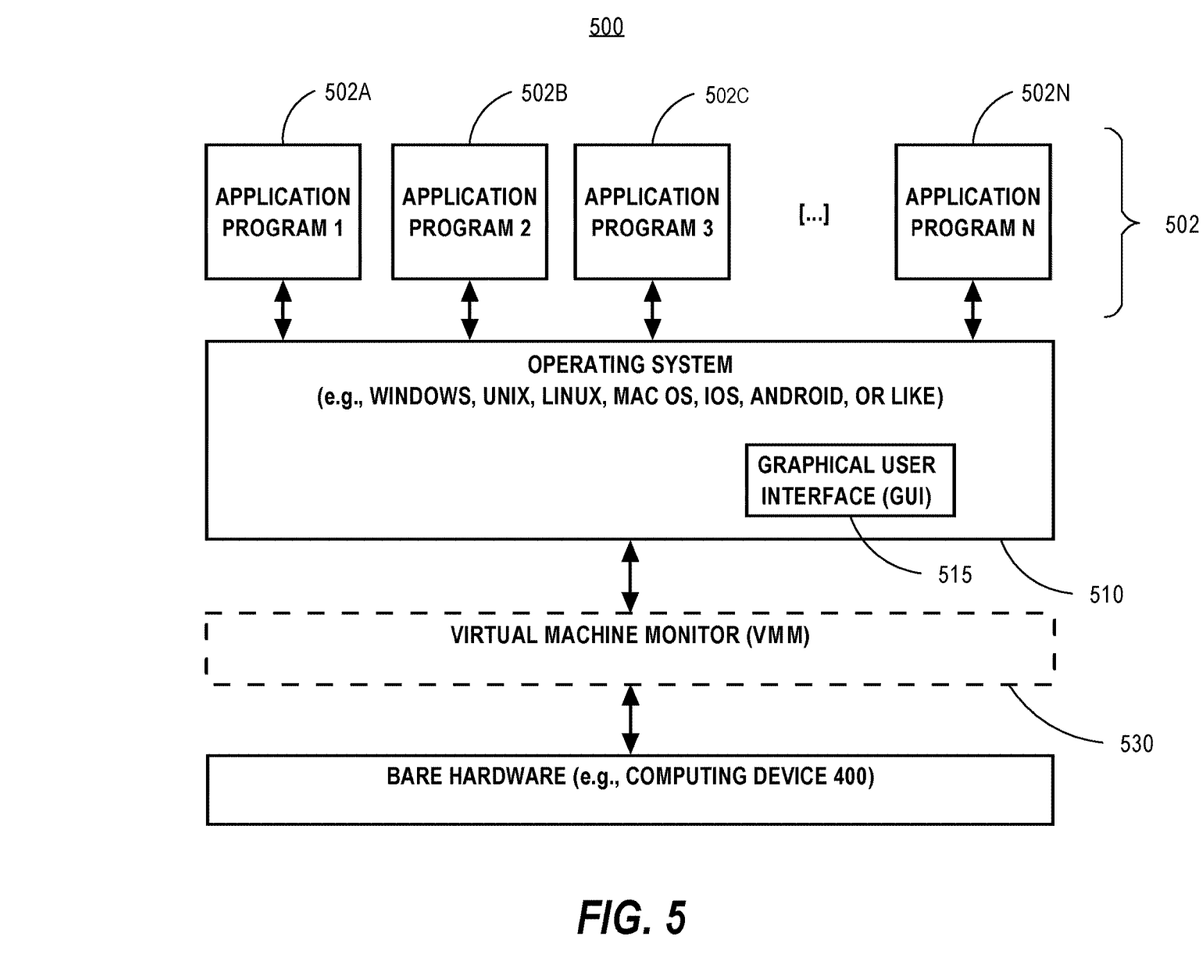
FIG. 5 is a block diagram of a software system for controlling the operation of the computing device.

FIG. 5 is a block diagram of a software system 500 that may be employed for controlling the operation of computing device 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing device 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on device 500 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user computer may supply additional inputs or terminate the session (e.g., log off).

OS 510 can execute directly on the bare hardware 520 (e.g., processor(s) 404) of device 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the device 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of device 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

6.0 Other Aspects of Disclosure

Using the systems and/or processing methods described herein, it is possible to rapidly and efficiently deploy a data extraction system. The present data extraction system is programmatic and can be deployed to a new client system infrastructure with minimal knowledge of the hardware implementation or other infrastructure details of the client system. Moreover, the present data extraction system can be deployed without the need for custom scripting.

Additionally, the present data extraction system provides various security advantages over existing data extraction techniques. By segregating the data transformation processes from the data extraction agent, the present system ensures that multiple parties can manage the data extraction at the client system without interference from business logic that may modify the data records. Any relevant business logic, including business logic that requires transforming the data records, will be applied to data records at the server system instead of the client system.

Moreover, the present data extraction system provides more reliability for pipeline of downstream data record transformers and/or data record consumers. Failure during data extraction of data records can cause many problems to downstream systems that rely on those extracted data records. Such pipelines of data are thus fragile. Using custom scripting to perform data extraction of data records increases the likelihood of failures during data extraction of data records, as any bugs or loopholes in a custom script will affect the ability of the custom script to perform data extraction. The present system avoids such custom scripts, thereby improving the stability of the data extraction system and improving the reliability of the pipeline of systems that rely on the data records being extracted.

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A computer-implemented method, comprising:
retrieving an extraction job specification comprising a source repository identifier that identifies a source repository comprising
a plurality of data records, a data recipient identifier that identifies a data recipient, a schedule that indicates a timing of when to retrieve the plurality of data records, specifications of one or more configuration files, packages or libraries that are usable to perform extraction, and one or more specifications of one or more inline processors;

using the extraction job specification, retrieving the plurality of data records from the source repository based on the schedule by invoking the one or more configuration files, packages or libraries;

applying the one or more inline processors to the plurality of data records that are retrieved to result in creating an extraction transaction from the plurality of data records, the extraction transaction comprising a subset of the plurality of data records and metadata;

sending the extraction transaction to the data recipient; and after sending the extraction transaction to the data recipient, applying a completion strategy processor to the plurality of data records from the source repository, the completion strategy processor comprising one or more data record manipulation operations as specified in the extraction job specification;

wherein the method is performed using one or more processors.

2. The method of claim 1 wherein the specifications of the one or more inline processors comprise one or more regular expressions or SQL queries.

3. The method of claim 1 wherein the specifications of the one or more inline processors comprise instructions that specify one or more processes for grouping a subset of the plurality of data records into a single transaction.

4. The method of claim 1 wherein the specifications of one or more configuration files, packages or libraries that are usable to perform extraction comprise specifications of any of a JAR, DLL or device driver.

5. The method of claim 1 wherein the completion strategy processor comprises instructions which when executed cause performing one or more of:
  deleting the plurality of data records;
  encrypting the plurality of data records;
  moving the plurality of data records to a storage location.

6. The method of claim 1 wherein the inline processor comprises instructions that specify one or more processes for filtering the plurality of data records.

7. The method of claim 6 wherein the instructions for filtering the plurality of data records comprise one or more regular expressions.

8. The method of claim 1 wherein the method further comprises receiving the extraction job specification from an extraction job specification repository.

9. A computer system, comprising:
  one or more digital data storage media;
  one or more processors that are communicatively coupled to the storage media;
  one or more programs stored in the storage media and configured for execution by the one or more processors, the one or more programs comprising instructions which when executed using the one or more processors cause the one or more processors to perform:
    retrieving an extraction job specification comprising a source repository identifier that identifies a source repository comprising a plurality of data records, a data recipient identifier that identifies a data recipient, a schedule that indicates a timing of when to retrieve the plurality of data records, specifications of one or more configuration files, packages or libraries that are usable to perform extraction, and one or more specifications of one or more inline processors;
    using the extraction job specification, retrieving the plurality of data records from the source repository based on the schedule by invoking the one or more configuration files, packages or libraries;
    applying the one or more inline processors to the plurality of data records that are retrieved to result in creating an extraction transaction from the plurality of data records, the extraction transaction comprising a subset of the plurality of data records and metadata;
    sending the extraction transaction to the data recipient; and
    after sending the extraction transaction to the data recipient, applying a completion strategy processor to the plurality of data records from the source repository, the completion strategy processor comprising one or more data record manipulation operations as specified in the extraction job specification.

10. The system of claim 9 wherein the specifications of the one or more inline processors comprise one or more regular expressions or SQL queries.

11. The system of claim 9 wherein the specifications of the one or more inline processors comprise instructions that specify one or more processes for grouping a subset of the plurality of data records into a single transaction.

12. The system of claim 9 wherein the specifications of one or more configuration files, packages or libraries that are usable to perform extraction comprise specifications of any of a JAR, DLL or device driver.

13. The system of claim 9 wherein the one or more programs further comprise instructions which when executed cause the completion strategy processor to perform one or more of:
  deleting the plurality of data records;
  encrypting the plurality of data records;
  moving the plurality of data records to a storage location.

14. The system of claim 9 wherein the inline processor comprises instructions that specify one or more processes for filtering the plurality of data records.

15. The system of claim 14 wherein the instructions for filtering the plurality of data records comprise one or more regular expressions.

16. The system of claim 9 wherein the one or more programs further comprise instructions which when executed cause receiving the extraction job specification from an extraction job specification repository.

\* \* \* \* \*